US 8,701,202 B2

(12) United States Patent
Herberth et al.

(10) Patent No.: US 8,701,202 B2
(45) Date of Patent: Apr. 15, 2014

(54) METHOD FOR GRANTING AN ACCESS AUTHORIZATION FOR A COMPUTER-BASED OBJECT IN AN AUTOMATION SYSTEM, COMPUTER PROGRAM AND AUTOMATION SYSTEM

(75) Inventors: Harald Herberth, Oberasbach (DE); Ulrich Kröger, Kaiserslautern (DE); Allan Sobihard, Bratislava (SK)

(73) Assignee: Siemens Aktiengesellschaft, Munich (DE)

( * ) Notice: Subject to any disclaimer, the term of this patent is extended or adjusted under 35 U.S.C. 154(b) by 1003 days.

(21) Appl. No.: 12/557,597

(22) Filed: Sep. 11, 2009

(65) Prior Publication Data

US 2010/0071029 A1    Mar. 18, 2010

(30) Foreign Application Priority Data

Sep. 12, 2008   (EP) .................................... 08016078

(51) Int. Cl.
*G06F 21/00*     (2013.01)
*G06F 21/62*     (2013.01)

(52) U.S. Cl.
CPC ........ *G06F 21/62* (2013.01); *G06F 2221/2141* (2013.01)
USPC .............................................. 726/26; 726/2

(58) Field of Classification Search
None
See application file for complete search history.

(56) References Cited

U.S. PATENT DOCUMENTS

| 8,117,640 B1 * | 2/2012 | Moriconi et al. ................. 726/1 |
| 2007/0157287 A1 * | 7/2007 | Lim ................................. 726/1 |

FOREIGN PATENT DOCUMENTS

| EP | 1 582 950 A2 | 10/2005 |
| WO | WO 2005/009003 | 1/2005 |

OTHER PUBLICATIONS

Kolovski, "XACML Policy Analysis Using Descriptive Logics", 2007, Proceedings of the 15th International World Wide Web Conference, pp. 1-31.*
Tim Moses et al.: "eXtensible Access Control Markup Language (XACML) Version 3.0 Policy Distribution Protocol Use-cases and Requirements," OASIS, Working Draft 01, Oct. 8, 2004, pp. 1-9.
Jan Peters et al.: "A Holistic Approach to security Policies—Policy Distribution with XACML over COPS," Electronic Notes in Theoretical Computer Science, Elsevier, No. 168, pp. 143-157 (2007).
Search Report dated Jan. 8, 2009, issued in a corresponding European Application No. EP 08 01 6078.

* cited by examiner

*Primary Examiner* — Benjamin Lanier
(74) *Attorney, Agent, or Firm* — King & Spalding LLP

(57) ABSTRACT

An access authorization for a computer-based object in an automation system comprising a plurality of network nodes is granted using a control file which is structured in line with a scheme for a markup language for granting access authorizations and which maps a hierarchic tree structure. In this case, access authorizations are mapped in an object model which has a hierarchic tree structure. A relevant subtree from the object model is ascertained for a selected network node, at which services are provided using computer-based objects, or when access to a computer-based object is requested, by an access guideline service. The control file is produced from the ascertained relevant subtree. The control file produced is made available for the selected network node or for access to the computer-based object.

16 Claims, 1 Drawing Sheet

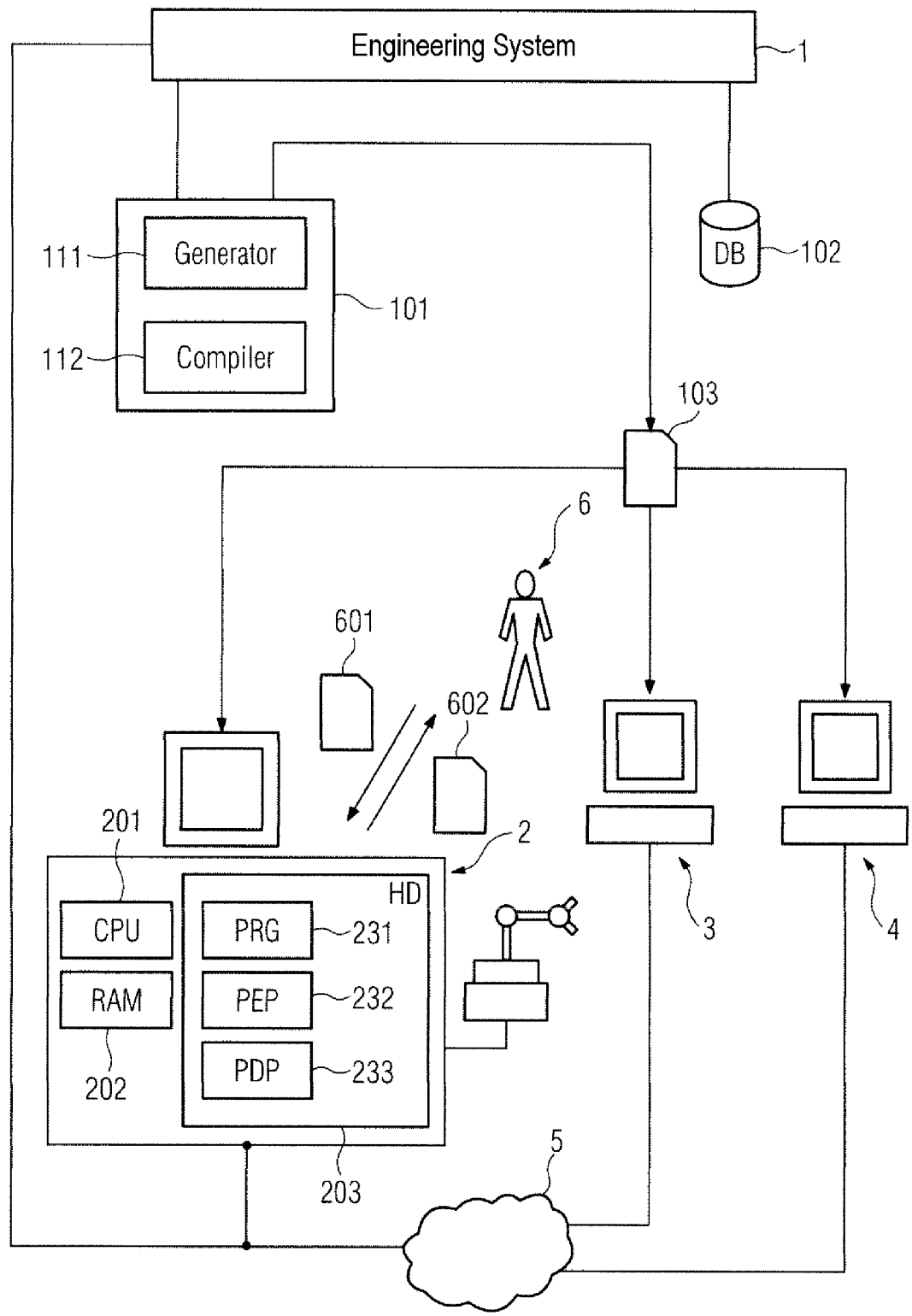

METHOD FOR GRANTING AN ACCESS AUTHORIZATION FOR A COMPUTER-BASED OBJECT IN AN AUTOMATION SYSTEM, COMPUTER PROGRAM AND AUTOMATION SYSTEM

CROSS-REFERENCE TO RELATED APPLICATIONS

This application claims the benefit of priority to European Application No. EP 08 01 6078, filed Sep. 12, 2008, which is incorporated by reference in its entirety.

TECHNICAL FIELD

This invention relates generally to methods for granting an access authorization for a computer-based object in an automation system, computer program, and automation system.

BACKGROUND

Continually increasing significance of information technology for automation systems means that methods for protecting networked system components, such as monitoring, control and regulatory devices, sensors and actuators, against unauthorized access are becoming increasingly important. In comparison with other areas of application for information technology, data integrity is particularly important in automation engineering. Particularly when measurement and control data are captured, evaluated and transmitted, it is necessary to ensure that complete and unaltered data are obtained. Intentional alterations, unintentional alterations or alterations caused by technical error must be avoided. Special requirements in automation engineering for security-related methods result, furthermore, from control traffic with a relatively large number of, but relatively short, messages. In addition, it is necessary to take account of a real-time capability of an automation system and of the system components thereof.

In order to define security guidelines and access authorizations, markup languages representing hierarchically structured data in the form of text files have been used a great deal to date, these being relatively simple for different information-technology systems to interchange, particularly via wide-ranging networks. One such markup language is XACML (eXtensible Access Control Markup Language), which has been standardized by the OASIS consortium for presentation and processing of authorization guidelines. In particular, XACML is used to create evaluatable rules which control access to resources of a system by subjects.

In large, distributed automation systems, security and access guidelines defined by means of XACML can become very extensive. A particular problem in this instance is system-wide distribution of such guidelines to all the network nodes which need to be covered within an automation system. Previously, this problem has been solved by specifying separate security and access guidelines for each network node, but this requires increased configuration complexity. As an alternative, it is possible to generalize or simplify system-wide security and access guidelines. A drawback in this case is that accuracy requirements are occasionally met only unsatisfactorily, and only coarse management of access rights is made possible. In areas of application which are dependent upon refined management of access rights, such approaches are therefore unsuitable.

SUMMARY

The present invention is therefore based on the object of providing an efficient, configuration-friendly method for granting an access authorization for a computer-based object in an automation system, and of specifying a suitable technical implementation for the method.

The invention achieves this object by means of a method for granting an access authorization for a computer-based object in an automation system comprising a plurality of network nodes, in which access authorizations are mapped in an object model which has a hierarchic tree structure, an access authorization for a computer-based object is granted using a control file which is structured in line with a scheme for a markup language for granting access authorizations and which maps a hierarchic tree structure, a relevant subtree from the object model is ascertained for a selected network node, at which services are provided using computer-based objects, or when access to a computer-based object is requested, by an access guideline service, the control file is produced from the ascertained relevant subtree, and the control file produced is made available for the selected network node or for access to the computer-based object. Additionally, the object can be achieved by computer program for granting an access authorization, which computer program can be loaded into a main memory in a computer and has at least one code section whose execution prompts an access authorization for a computer-based object to be able to be granted using a control file which is structured in line with a scheme for a markup language for granting access authorizations and which maps a hierarchic tree structure, wherein access authorizations can be mapped in an object model which has a hierarchic tree structure, a relevant subtree from the object model to be ascertained for a selected network node, at which services are provided using computer-based objects, or when access to a computer-based object is requested, the control file to be produced from the ascertained relevant subtree, and the control file produced to be made available for the selected network node or for access to the computer-based object when the computer program is running in the computer. Also, the object can be achieved by an automation system comprising a first computer unit for granting an access authorization for a computer-based object using a control file which is structured in line with a scheme for a markup language for granting access authorization and which maps a hierarchic tree structure, wherein access authorizations can be mapped in an object model which has a hierarchic tree structure; and a second computer unit for ascertaining a relevant subtree from the object model for a selected network node, at which services are provided using computer-based objects, or when access to a computer-based object is requested, and for providing a control file, produced from the ascertained relevant subtree, for the selected network node or for access to the computer-based object. Advantageous developments of the present invention are specified in the dependent claims.

In line with the invention, an access authorization for a computer-based object in an automation system comprising a plurality of network nodes is granted using a control file which is structured in line with a scheme for a markup language for granting access authorizations and which maps a hierarchic tree structure. In this case, access authorizations are mapped in an object model which has a hierarchic tree structure. A relevant subtree from the object model is ascertained for a selected network node, at which services are provided using computer-based objects, or when access to a computer-based object is requested, by an access guideline service. The ascertained relevant subtree is used to produce the control file, which is made available for the selected network node or for access to the computer-based object. In this way, it is possible to disregard system-wide distribution of large volumes of data with security and access guidelines.

Examples of computer-based objects are, without restricting the general nature of this term, operating systems, control or application programs, services provided by operating systems, control or application programs, service components, performance characteristics, functions or procedures, access rights for system resources or peripheral devices and data on a storage medium. In this context, functions or procedures also include, in particular, enabling of access authorizations in an automation system. A computer-based object may furthermore be associated with a computation process which comprises all the units of an executable program loaded into a main memory. A computer is intended to be understood to mean, by way of example, PCs, notebooks, servers, PDAs, mobile phones and control and regulatory modules, sensors or actuators in automation engineering, vehicle engineering, communications engineering or medical engineering—generally devices in which computer programs are executed. Furthermore, the control file may also be a DLL (Dynamic Link Library) file and/or a shared object comprising program code, which shared object is statically or dynamically linked to the control program.

An access authorization for a computer-based object is preferably granted by a control program, associated with the computer-based object, using a control file. The control program can furthermore be used to provide a service of the automation system within a service-oriented architecture. The service-oriented architectures (SOAs) are aimed at structuring services in complex organizational units and making them available for a multiplicity of users. In this case, available components in a data processing system, such as programs, databases, servers or websites, are coordinated such that services provided by the components are combined into services and made available to authorized users, for example. Service-oriented architectures allow application integration by concealing complexity of individual subcomponents of a data processing system behind standardized interfaces. This in turn allows simplification of access authorization regulations.

BRIEF DESCRIPTION OF THE DRAWINGS

The invention is explained in more detail below using an exemplary embodiment with reference to the drawing, in which:

FIG. 1 shows a schematic illustration of an automation system for implementing a method for granting an access authorization for a computer-based object.

DETAILED DESCRIPTION

The automation system shown in FIG. 1 comprises an engineering system 1, a server unit 101 connected to the engineering system 1 for providing an access guideline service and also a plurality of computer units 2-4 connected to one another and to the engineering system 1 via a communication network 5 as network nodes. The engineering system 1 is used for configuring, servicing, starting up and documenting the automation system, particularly for configuring the access guideline service.

Access authorizations within the automation system are mapped in an object model which has a hierarchic tree structure and is stored in a relational database 102 in the engineering system 1. A computer unit 2 grants an access authorization for a computer-based object by means of a control program 231, which is associated with the computer-based object and runs on the computer unit 2, using a control file 103. The control file 103 is structured in line with a scheme for a markup language for granting access rights and maps a hierarchic tree structure. On the basis of a request for access to a computer-based object or a priori for a selected network node at which services are provided using computer-based objects, the access guideline service ascertains a relevant subtree from the object model, which is used to produce the control file 103. The control file 103 produced is then made available by the access guideline service for access to the computer-based object or a priori for the selected network node.

To speed up the provision of control files, at least one portion of the object model is loaded into a main memory in the server unit 101. In addition, the object model is indexed by the engineering system 1 in order to speed up production of control files. In line with one preferred embodiment, the access guideline service respectively ascertains a relevant subtree from the object model and a priori makes a network-node-specific control file available for essentially all the network nodes at which services are provided and/or used.

The control program 231 is used to provide a service of the automation system within a service-oriented architecture. The control program 231 is stored on a hard disk 203 as a nonvolatile memory unit of the computer unit 2, and its program code can be loaded into a main memory 202 in the computer unit 2 and can be executed by a processor unit 201.

In the present exemplary embodiment, the control program 231 is used for actuating metrological peripherals of the computer unit 2. The control program 231 can be executed only by a user who is authorized to do so, however, and/or a measurement result captured by virtue of execution of the control program 231 can be checked only by an authorized user. In addition, the computer-based object is a measurement result 602 which is captured by the computer unit 2 as a computer-aided sensor unit and is requested by a user 6 of the automation system by means of a check 601. The user 6 may also be another appliance within the automation system.

Besides the control program 231, the hard disk 203 stores monitoring programs 232, 233 for checking authorization and granting access, the program code of said monitoring programs implementing a policy enforcement point and a policy decision point upon execution in the computer unit 2. The policy decision point serves as a decision entity for a check to determine whether a resource request from a user is authorized in line with an access control guideline which is described by the object model stored in the database 102 as a policy store. In line with a checking result ascertained by the policy decision point, the policy enforcement point, as an enabling entity, enables or disables the requested resource for the respective user.

When the object model stored in the database 102 as a policy store is changed, the server unit 101 connected to the engineering system 1 produces the control file 103 again. In this case, a generator 111 in the server unit 101 undertakes primary conversion tasks for the object model, while a compiler 112 in the server unit 101 takes account of runtime-dependent parameters for the control program 231 and prescribes them for the control file 103. The control file 103 is then distributed to the respective computer unit 2-4 by the server unit 101.

The scheme for producing the control file 103 is described by XACML (eXtensible Access Control Markup Language). In this way, the control file 103 maps a hierarchic tree structure which has policies comprising rules and policy sets comprising policies as regulatory elements in hierarchically increasing importance. In this case, a policy comprises a monitoring element (target), in which a resource-requesting user (subject), a requested resource and a use action are stipulated for verifying an applicability of the policy. If a policy is applicable then a condition element (condition) that a rule in the policy comprises is used to check whether a decision indicated in the rule about grant of an access authorization has been stipulated. A plurality of simultaneously applicable policies are resolved by means of combining algorithms, so that a final decision about enabling or disabling a resource is made at any rate. Preferably, combining algorithms are used for every hierarchy level.

Advantageously, rules and policy sets also comprise monitoring elements for verifying the applicability thereof. However, only rules have condition elements. When the control file 103 is produced from the object model stored in the database 102, preferably all elements of the object model are furthermore assigned respective corresponding condition elements, rules, policies and/or policy sets for the control file.

The method described above is preferably implemented by a computer program which can be loaded into a main memory in the server unit 101. The computer program has at least one code section whose execution prompts an access authorization for a computer-based object to be able to be granted using a control file. The control file is structured in line with a scheme for a markup language for granting access authorizations and maps a hierarchic tree structure, wherein access authorizations can be mapped in an object model which has a hierarchic tree structure. In addition, a relevant subtree from the object model is ascertained for a selected network node, at which services are provided using computer-based objects, or when access to a computer-based object is requested. The control file is produced from the ascertained relevant subtree and is made available for the selected network node or for access to the computer-based object when the computer program is running on the server unit 101.

The method described above can be optimized in terms of performance capability by customizing the tree structure mapped by the control file. To this end, tree structures are traversed and, on the basis thereof, subtrees with data which are actually relevant for local handling of access requests are extracted. Preferably, data and indices for such trimming are provided on the basis of a policy configuration in order to avoid negative effects at runtime level.

In line with a first possible trimming approach, the traversing of a policy tree merely involves a check for equality of character strings (strings). An Equal operator can be calculated with relatively little complexity. In addition, operators which are significantly more complex to calculate result in matches only rarely.

Alternatively, a policy tree can be traversed recursively. As soon as a rule is ascertained during traversing, a relevant path through the policy tree has been ascertained, and all the restrictions from attribute matches are stored in an indexed structure. Trimming is then performed on ascertainment of all the relevant paths which fit a prescribed search index. A final set of paths is obtained from an intersection between all fitting paths over all the search indices. By forming a union, a set of relevant nodes of a policy tree is ascertained therefrom.

A further approach to trimming a policy tree involves calculating updated indices for every single node in a policy tree, said indices relating to a match between respective node attributes. In order to prevent multiple insertion of the same node, every traversed node is marked accordingly. Using a structure of ascertained indices, it is a simple matter to ascertain nodes which fit the node attributes. By forming an intersection between the ascertained fitting nodes, a result set of relevant nodes is obtained. Finally, a check is performed to determine whether the nodes in the result set are connected to the root of the policy tree and to a rule. This is done by means of a quick traverse of the policy tree, which verifies an association between a node and the result set. Preferably, nodes detected during the quick traverse are marked as detected in order to prevent the respective node from being handled more than once.

The application of the present invention is not limited to the exemplary embodiment described.

What is claimed is:

1. A method for granting an access authorization for a computer-based object in an automation system comprising a plurality of network nodes, the method comprising:
   mapping, by a computer, access authorizations in an object model which has a hierarchic tree structure;
   receiving, by the computer, a request to access the computer-based object;
   responsive to receiving the request, ascertaining, by the computer, a relevant subtree from the object model for a selected network node at which services are provided using the computer-based object;
   producing, by the computer, a control file from the ascertained relevant subtree, wherein producing the control file from the ascertained relevant subtree of the object model comprises:
      mapping elements of the hierarchic tree structure in an order of importance, wherein each element of the hierarchic tree structure comprises one or more rules;
      recursively traversing the hierarchical tree structure;
      ascertaining a set of rules from the one or more rules of the hierarchical tree structure associated with the access of the computer-based object;
      responsive to ascertaining the set of rules, ascertaining a relevant path associated with each rule of the ascertained set of rules;
      mapping data associated with the each rule of the ascertained set of rules to an indexed structure;
      determining one or more relevant paths from the ascertained relevant path associated with each rule of the ascertained set of rules such that the one or more relevant paths fit a search index; and
      generating a final set of relevant paths by intersecting the determined one or more relevant paths;
   making available, by the computer, the produced control file for the selected network node or for access to the computer-based object; and
   granting, by the computer, the access authorization for the computer-based object using the control file which is structured in line with a scheme for a markup language for granting access authorizations and which maps the hierarchic tree structure.

2. The method as claimed in claim 1, wherein the access authorization for the computer-based object is granted by a control program, which is associated with the computer-based object, using the control file.

3. The method as claimed in claim 2, wherein the control program is used to provide a service of the automation system within a service-oriented architecture.

4. The method as claimed in claim 1, wherein the control file is produced by an access guideline service and is made available for the selected network node or for access to the computer-based object.

5. The method as claimed in claim 1, wherein an access guideline service respectively ascertains the relevant subtree from the object model and makes a network-node-specific control file available for each network node at which services are provided and/or used.

6. The method as claimed in claim 1, wherein the object model is stored in a relational database system, and wherein the object model is loaded as an object tree into a main memory in a computer unit.

7. The method as claimed in claim 1, wherein an access guideline service is configured by an engineering system for configuring, servicing, starting up and/or documenting the automation system.

8. The method as claimed in claim 7, wherein the object model is indexed by the engineering system in order to speed up production of control files.

9. The method as claimed in claim 1, wherein the scheme for producing the control file is described by an eXtensible access control markup language, known as XACML.

10. The method as claimed in claim 9
wherein the control file comprises a policy; and
wherein the policy comprises a monitoring element in which a resource-requesting user, a requested resource and a use action are stipulated for verifying an applicability of the policy.

11. The method as claimed in claim 10, wherein the one or more rules have monitoring elements for verifying the applicability thereof.

12. The method as claimed in claim 10, wherein each rule has one or more condition elements.

13. A non-transitory computer readable medium comprising instructions that when executed by a processor perform a method for granting an access authorization, the method comprising:
granting the access authorization for a computer-based object using a control file which is structured in line with a scheme for a markup language for granting access authorizations and which maps a hierarchic tree structure, wherein the access authorizations are mapped in an object model which has the hierarchic tree structure;
ascertaining a relevant subtree from the object model for a selected network node at which services are provided using the computer-based object when access to the computer-based object is requested;
producing the control file from the ascertained relevant subtree, wherein producing the control file from the ascertained relevant subtree of the object model comprises:
mapping elements of the hierarchic tree structure in an order of importance, wherein the elements of the hierarchic tree structure comprise one or more rules;
recursively traversing the hierarchical tree structure;
ascertaining a set of rules from the one or more rules of the hierarchical tree structure associated with the access of the computer-based object;
responsive to ascertaining the set of rules, ascertaining a relevant path associated with each rule of the ascertained set of rules;
mapping data associated with the each rule of the ascertained set of rules to an indexed structure;
determining one or more relevant paths from the ascertained relevant path associated with each rule of the ascertained set of rules such that the one or more relevant paths fit a search index;
generating a final set of relevant paths by intersecting the determined one or more relevant paths; and
making available the produced control file for the selected network node or for access to the computer-based object, when the computer program is running in the computer.

14. An automation system comprising:
a first computer unit for granting an access authorization for a computer-based object using a control file which is structured in line with a scheme for a markup language for granting access authorization and which maps a hierarchic tree structure, wherein access authorizations are mapped in an object model which has the hierarchic tree structure; and
a second computer unit for ascertaining a relevant subtree from the object model for a selected network node at which services are provided using the computer-based object when access to the computer-based object is requested, and for providing the control file, produced from the ascertained relevant subtree, for the selected network node or for access to the computer-based object,
wherein producing the control file from the ascertained relevant subtree of the object model comprises:
mapping elements of the hierarchic tree structure in an order of importance, wherein the elements of the hierarchic tree structure comprise one or more rules;
recursively traversing the hierarchical tree structure;
ascertaining a set of rules from the one or more rules of the hierarchical tree structure associated with the access of the computer-based object;
responsive to ascertaining the set of rules, ascertaining a relevant path associated with each rule of the ascertained set of rules;
mapping data associated with the each rule of the ascertained set of rules to an indexed structure;
determining one or more relevant paths from the ascertained relevant path associated with each rule of the ascertained set of rules such that the one or more relevant paths fit a search index; and
generating a final set of relevant paths by intersecting the determined one or more relevant paths.

15. The method of claim 10, further comprising:
verifying the applicability of a policy based on the resource-requesting user, the requested resource and the use action; and
responsive to verifying that the policy is applicable, verifying, based on a condition element, if a decision in a rule of the one or more rules that indicates a grant of the access authorization is stipulated.

16. The method of claim 1, further comprising:
determining if the object model has changed; and
responsive to determining that the object model has changed, generating another control file associated with the changed object model, wherein generating another control file comprises:
providing runtime-dependent parameters for a computer program configured to process at least one of the control file and the other control file.

* * * * *